United States Patent [19]

Pelka et al.

[11] Patent Number: 4,836,862
[45] Date of Patent: Jun. 6, 1989

[54] THERMOPHOTOVOLTAIC SYSTEM

[76] Inventors: David G. Pelka, 8315 Kenyon Ave., Los Angeles, Calif. 90045; John M. Popovich, 2742 S. La Cienega, Los Angeles, Calif. 90034; Roc V. Fleishman, 432½ Altair Pl., Venice, Calif. 90291

[21] Appl. No.: 43,435

[22] Filed: Apr. 28, 1987

[51] Int. Cl.$^4$ ............................................. H02N 6/00
[52] U.S. Cl. .................................................. 136/253
[58] Field of Search ........................................ 136/253

[56] References Cited

U.S. PATENT DOCUMENTS

| | | | |
|---|---|---|---|
| 3,076,861 | 2/1963 | Samulon et al. | 136/257 |
| 3,591,420 | 7/1971 | Streed | 136/257 |
| 3,929,510 | 12/1975 | Kittl | 136/247 |
| 4,234,352 | 11/1980 | Swanson | 136/253 |
| 4,313,024 | 1/1982 | Horne | 136/253 |
| 4,316,048 | 2/1982 | Woodall | 136/253 |
| 4,419,532 | 12/1983 | Severns | 136/253 |
| 4,707,560 | 11/1987 | Hottel et al. | 136/253 |

OTHER PUBLICATIONS

J. Werth, "Thermo-Photovoltaic Energy Conversion", General Motors Corporation, *Proceedings 17th Power Sources Conference* May (1963), pp. 23–27.

"Thermovotaic Converter" General Motors Corp., Final Report, Contract No. DA 36-039-AMC-02255E GM Defense Research Laboratories, Santa Barbara, California (Feb. 1964), pp. 1–2, 62–65.

*Primary Examiner*—Aaron Weisstuch
*Attorney, Agent, or Firm*—William W. Haefliger

[57] ABSTRACT

A highly efficient combustor/reactor for a thermophotovoltaic process is provided.

It includes:

(a) an insulated combustion chamber containing a combustion zone,
(b) first and second beds of refractory particles exposed to that zone,
(c) structure for supplying a first combustion reactant to that zone,
(d) structure for flowing a second combustion reactant to the zone via one of the beds during time $T_1$ and via the other of the beds during time $T_2$,
(e) structure for removing combustion products from the zone via the other of the beds during time $T_1$, and via the one bed during time $T_2$,
(f) and thermophotovoltaic cell apparatus exposed to heat radiated from the zone.

20 Claims, 2 Drawing Sheets

THERMOPHOTOVOLTAIC SYSTEM

BACKGROUND OF THE INVENTION

1. Field of the Invention

This invention relates generally to improvements in thermophotovoltaic generator systems, and more particularly, to thermophotovoltaic generators providing improved efficiency and power density, at substantially reduced cost.

2. Brief Description of the Prior Art

Thermophotovoltaic generators involve systems for converting radiant energy from a thermal source into electricity. In most thermophotovoltaic generators, energy from a source such as a high temperature burner or high temperature radiator becomes incandescent and illuminates thermophotovoltaic cells which convert a portion of the incident radiation into electricity.

One of the principal problems encountered in many thermophotovoltaic generators is cell contamination. For example, in the combustion of a fossil fuel, the combustion by-products tend to deposit on the cell, thereby interfering with efficient operation of the generator. The thermophotovoltaic generator itself normally operates at temperatures usually well in excess of 1,000 degrees K.

An oxidant and fuel are introduced into the combustion chamber of the thermophotovoltaic generator in order to create combustion. When the combustion products exit the thermophotovoltaic generator, they should pass through a heat exchange mechanism to remove as much of the exhaust heat as possible. In like manner, intake air which is introduced into the generator should be pre-heated by the enthalpy of the exhaust stream before it enters the combustion chamber. The previous attempts to produce such thermophotovoltaic generator have been lacking, at the very least, in providing an effective heat exchange mechanism.

OBJECTS OF THE INVENTION

It is, therefore, one of three primary objects of the present invention to provide a thermophotovoltaic generator system and process capable of efficient operation, and which is highly reliable, and which overcomes the above described disadvantages.

Basically, the process of the invention includes the steps:

(a) feeding combustion reactants to a combustion zone, the reactants being fed to said zone at initial temperature $T_a$ and having enthalpy content $H_1$, (b) adding recuperated heat $Q_r$ to the reactants fed to the combustion zone to raise the reactants temperature to $T_2$, and to raise enthalpy content to $H_2$, (c) combusting the reactant in said zone to produce reaction products at increased temperature $T_3$ and with enthalpy content $H_3 \cong H_2$, (d) radiating heat from said zone at a rate characterized in that the radiation per unit area per unit time per unit mass of reaction products is $q_p$, the total heat available for radiation being $Q_{34} = H_3 - H_4$ where $H_4$ is the reduced enthalpy of the reaction products, and converting said radiated heat into photovoltaic produced electricity, (e) extracting $Q_r$ from said reaction products of combustion for return to the reactant as per (b) above, (f) removing the products of combustion as exhaust and at reduced temperature $T_e$ and enthalpy $H_5$, (g) providing a bed of refractory particles adjacent said combustion zone, and (h) periodically reversing the direction of flow of hot reactant through said bed.

As will be seen, the combustion reactants typically include methane and air, the amount of air being in excess of that needed for combustion of the methane. Further, $T_3$ is typically at least about 3700 F., radiation occurring at said temperature $T_3$. Also, the above step (e) is typically carried out by passing the reaction products of combustion in heat exchange relation with the reactants after said step (d), heat radiation from said combustion zone.

Apparatus incorporating the invention, as related to the above system, includes:

(a) an insulated combustion chamber containing a combustion zone;

(b) first and second beds of refractory particles exposed to said zone, (c) means for supplying a first combustion reactant to said zone, (d) means for flowing a second combustion reactant to said zone via one of said beds during time $T_1$ and via the other of said beds during time $T_2$, (e) means for removing combustion products from said zone via the other of said beds during time $T_1$, and via the one bed during time $T_2$, (f) and thermophotovoltaic cell means exposed to heat radiated from said zone.

As will appear, the chamber typically includes a heat resistant side wall and a heat resistant top wall, the top wall containing an opening, the cell means located in association with said top wall opening; the other bed typically surrounds the one bed, and a separator wall is located therebetween, the combustion zone overlying said beds; air supply plenums typically underlie the beds and jet means is associated with the chamber top wall to discharge hydrocarbon reactant such as methane to the combustion zone; and a coolant is supplied to the thermophotovoltaic cell means to remove heat for external use.

These and other objects and advantages of the invention, as well as the details of illustrated embodiments, will be more fully understood from the following description and drawings, in which:

DRAWING DESCRIPTION

DETAILED DESCRIPTION

Figure 1:
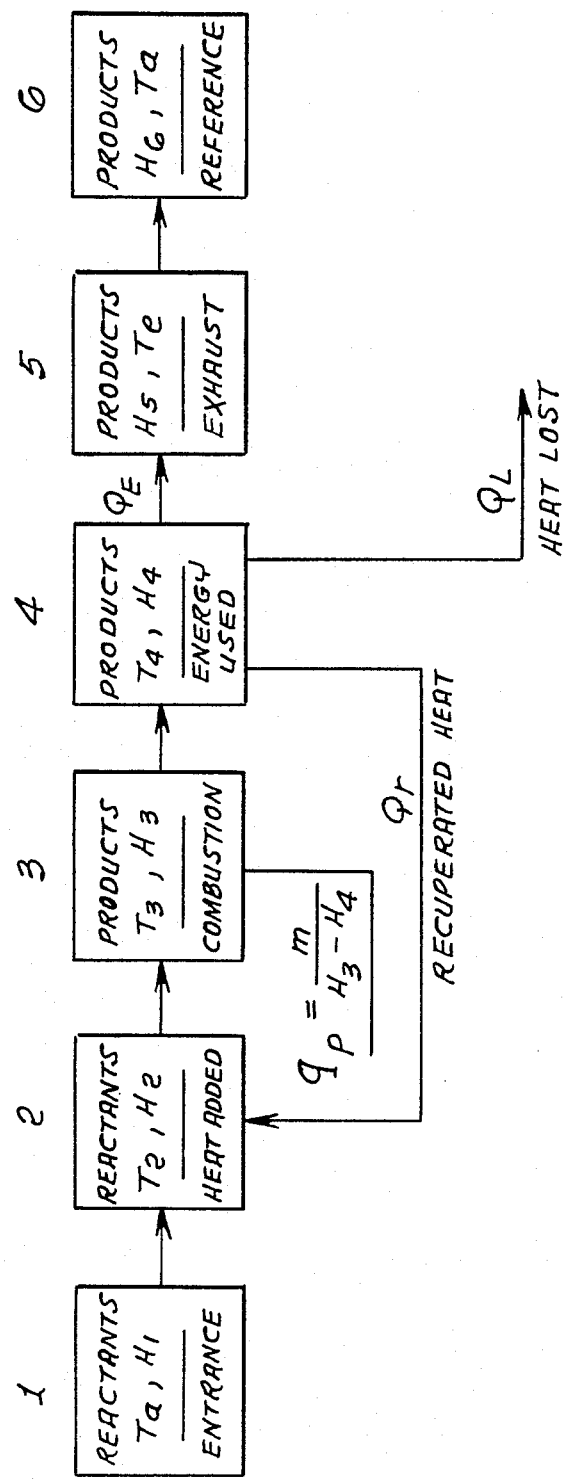
FIG. 1 is a system diagram.

The thermodynamic states of a typical combustor are considered at six points in FIG. 1.

At the input 1 to the combustor, the reactants (for example methane and air) are considered to be at ambient temperature, $T_a$, and to have enthalpy content $H_1$.

At point 2, recuperated heat, $Q_r$, is added to the reactants to raise the temperature of the reactants to $T_2$ with enthalpy content $$H_2 = H_1 + Q_r \tag{1}$$

In the enthalpy balance to follow, care should be taken in consideration of the signs and the distinction between heat and enthalpy. Heat is a difference in the enthalpy of the system at two different states. We use the conventional notation that work done by the system on the surroundings has a negative sign while work done by the surroundings on the system has a positive sign The "system" in our usage is defined as the sum of all reactants and products of the reactions throughout the process. The surroundings are defined as all the components and fixtures of the combustor, including functional and passive parts.

The enthalpy increase given in equation (1) is used to calculate the temperature $T_2$ through use of the specific heat at constant pressure, $C_p$, known as a function of temperature. An alternate method, employed in the calculations below, is to use a free energy minimization technique to calculate the temperature at the given enthalpy directly for a given concentration of products (or reactants). This is conveniently done using the STANJAN programs developed by W. C. Reynolds of Stanford University.

At the third point 3, in the system, we consider the reaction as having occured such that the products of the combustion reaction are now at the adiabatic isobaric temperature of the reaction. Thus, $H_3 = H_2$ and the temperature increases to $T_3$, the maximum adiabatic flame temperature for the mixture. This temperature is also conveniently calculated by the STANJAN routines.

At the fourth point 4, in the consideration of the process, heat is removed at an effective temperature of radiation $T_4$. The radiation per unit area per unit time per unit mass $q_p$, is determined by the relation:

$$q_p = F_t(T_4^4 - T_a^4) \tag{2}$$

In equation (2), $F_t$ is a constant. The enthalpy at point 4 is given by the concentration of the products and the temperature $T_4$. When this is calculated from the STANJAN routines, the total heat available for radiation is determined as $$Q_{34} = H_3 - H_4 \tag{3}$$

The mass flow required to balance the thermodynamic and radiated heat is thus:

$$\text{mass flow} = Q_p/Q_{34} \tag{4}$$

At the 5th point 5 in the process, the products exit the combustor at temperature $T_e$ with enthalpy $H_5$. This is determined or calculated by assuming that the composition of the mixture of products and remaining reactants is fixed at the composition of $T_4$. This assumption is based on the observation that as the reaction mixture cools quickly, the reaction rates "slow down" to the point where reaction times are long compared to the time required to exit the combustor.

The amount of enthalpy left in the exhaust at temperature $T_e$ is fixed by the amount of heat recuperated in the combustor, $Q_r$, and the amount lost to the environment, $Q_1$. Let the difference in enthalpy between the 4th point and the exhaust be defined by $$Q_u = H_4 - H_6 \tag{5}$$

The values of $Q_1$ and $Q_r$ are defined relative to this quantity as:

$$Q_1 = LQ_u \tag{6}$$

and $$Q_r = X(1-L)Q_u \tag{7}$$

In equations (6) and (7), L and X are constants. The products of the reaction equilibrated back to $T_a$ represent the 6th point. Thus, the enthalpy of the products at $T_a$ ($H_6$) minus the enthalpy of the reactants at $T_a$ ($H_1$) represents the maximum heat available from the system. In the actual method for calculating self-consistent values, the temperature at $T_4$ is selected along with the air to fuel ratio. The air to fuel ratio fixes the composition of both reactants and products at $T_4$ based on the free energy minimization technique. This along with $T_4$ fixes the enthalpy at point 4 ($H_4$). Next the enthalpy at point 6 can be calculated knowing the composition and $T_a$. If X and L are selected, $Q_u$ and thus $H_5$ can be determined as calculated. The quantity of $H_5$-$H_6$ defines the heat contained in the exhaust, $Q_e$, and using $H_5$ the exhaust temperature $T_5$ can be determined or calculated.

Since the starting temperatures and composition have been defined, $H_1$ can be calculated. Since X and L are known, $Q_r$ can be calculated, and calculations through points 2 and 3 can be made. The calculations up to this point specify $Q_{34}$ also with one further assumption, the value of $F_t$, $Q_p$ is calculated and then the mass flow rate from Equation 4.

Further investigation of thermodynamic constraints operating on the system involve finding limitations on X. With most regenerative designs, the products will be limited to the gaseous state, with consequent limit to the maximum value attainable for X, the amount of heat regenerated.

The above gives an energy and mass consistent set of values which can be compared with known values for any design of reactor. Generally, one will know $T_a$, the fuel to air ratio, the fuel composition, the exhaust temperature ($T_5$), and the heat transmitted out of the system $q_p$. It is possible with optical pyrometry or other techniques usable at the high temperatures involved to estimate $T_4$.

These measured values fix the range of the other parameters in the model and allow for comparison of various designs. The attempt is made to minimize L and maximize the fraction of heat regenerated while ensuring the exhaust temperature suits the needs of the installation. These steps will maximize highest output per given mass flow of fuel.

Taking a typical example of the combustion proces occurring in 200% excess air, fixing ambient temperature at 293 K. and radiation temperature at 2300 K., the amount of heat lost to the environment can be fixed at 10% to examine the effects of percentage of heat regenerated (See Table 1). The heat transfer function is approximated at 0.5. As recuperation efficiency increases from 80% to 95%, the mass flow rate of fuel and air mixture needed decreases to nearly one third of that needed at 80%. Thermal efficiency increases from 24% to 61% as the recuperation efficiency of the system goes from 80% to 95%. Combustion temperature varies less than 100 K. while exhaust temperature varies from 632 K. at 80% heat recovery to 308 K. at 95% regeneration.

TABLE 1

| Parametric Model Values for a Typical Case | | | | |
| --- | --- | --- | --- | --- |
| Recuperation Efficiency | Mass Flow Rate (kg/sec) | Thermal Efficiency | Combustion Temperature | Exhaust Temperature |
| 95% | 1.37 | 61% | 2589 K. | 308 K. |

TABLE 1-continued

Parametric Model Values for a Typical Case

| Recuperation Efficiency | Mass Flow Rate (kg/sec) | Thermal Efficiency | Combustion Temperature | Exhaust Temperature |
|---|---|---|---|---|
| 94% | 1.43 | 58% | 2579 K. | 330 K. |
| 93% | 1.49 | 56% | 2577 K. | 352 K. |
| 92% | 1.56 | 54% | 2559 K. | 374 K. |
| 91% | 1.64 | 51% | 2549 K. | 396 K. |
| 90% | 1.72 | 49% | 2538 K. | 418 K. |
| 89% | 1.81 | 46% | 2527 K. | 440 K. |
| 88% | 1.91 | 44% | 2517 K. | 462 K. |
| 87% | 2.02 | 41% | 2506 K. | 483 K. |
| 86% | 2.15 | 39% | 2496 K. | 505 K. |
| 85% | 2.29 | 36% | 2484 K. | 526 K. |
| 84% | 2.46 | 34% | 2473 K. | 548 K. |
| 83% | 2.65 | 32% | 2461 K. | 569 K. |
| 82% | 2.87 | 29% | 2450 K. | 590 K. |
| 81% | 3.13 | 27% | 2438 K. | 611 K. |
| 80% | 3.44 | 24% | 2426 K. | 632 K. |

Air to fuel ratio = 3/1
Ambient temperature = 2300 K.
Percentage of heat lost to surroundings = 10%
Transfer function = .5

Figure 2:
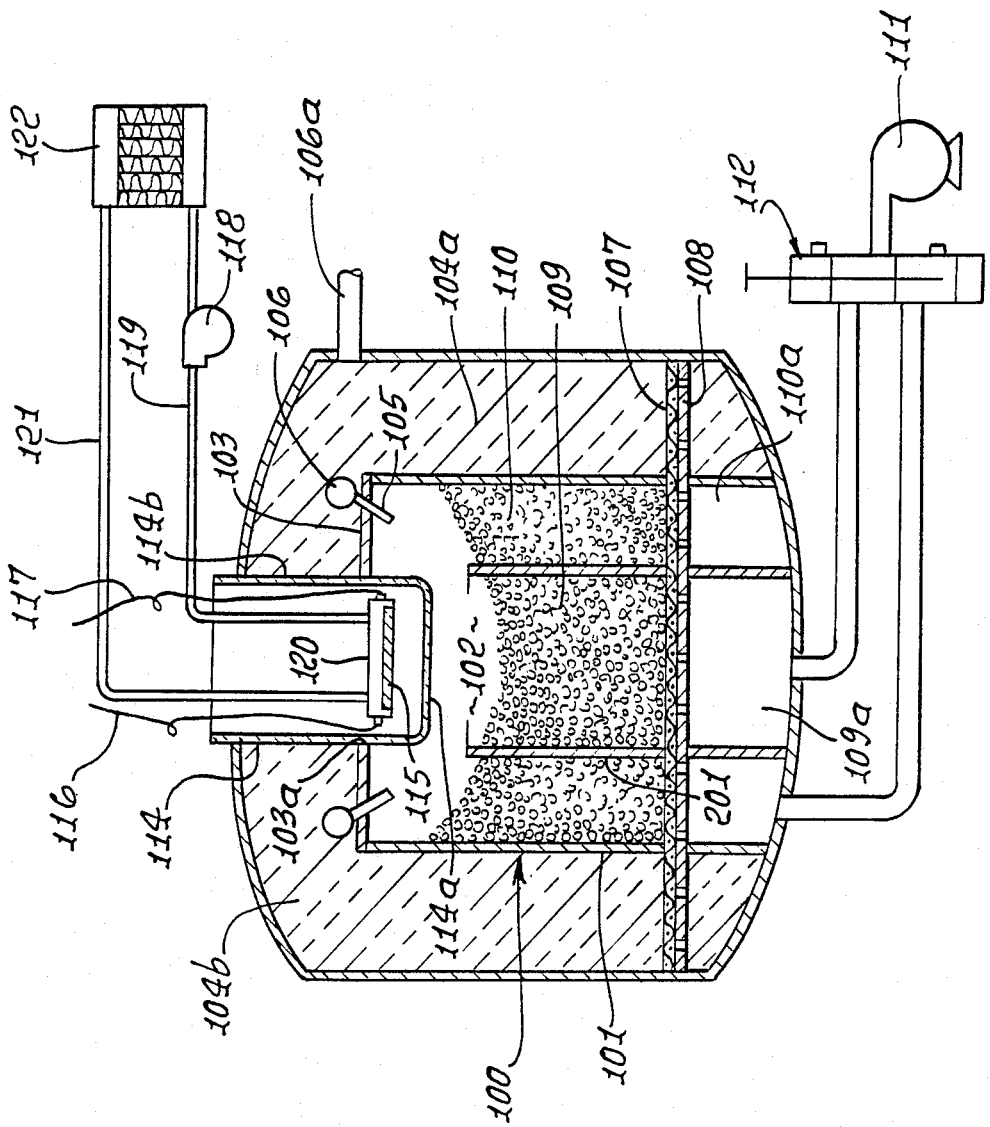
FIG. 2 is a schematic cross-sectional view showing a combustor/regenerator.

Referring now to FIG. 2, the method of the invention can be carried out using the apparatus as shown. It includes a vessel 100 defined by an outer alumina cylindrical side wall 101 containing a combustion zone 102, and an annular alumina top wall 103 extending over that zone. High temperatures resistant insulation extends at 104a about side wall 101, and at 104b above the top wall 103. Combustible gas (such as methane) jets 105, made of soft copper penetrate wall 103 and feed combustible gas from a manifold 106 into the zone 102. See also gas supply hose 106a.

A screen 107 and a perforated metal support plate 108 extend transversely beneath zone 102, as shown. Inner and outer particle beds 109 and 110, respectively, are supported on the screen and plate, beneath zone 102, bed 110 extending annularly about the inner bed, and separated therefrom by a zirconia cylinder 201. The two beds comprise zirconia particles. Inner and outer plenums 109a and 110a are located beneath the two beds and beneath screen 107 and support plate 108.

The temperature in the combustion zone is at least about 3700 F. and the exhaust gas temperature $T_e$ lies between 132° K. and 308° K.

Air flow is delivered under pressure by a blower 111 via switch 112 to plenum 109a then up through screen 107 and support plate 108 and through the inner bore 109 (wherein it is pre-heated) to the combustion chamber or zone 102, where combustion occurs after mixing with the fuel gas. Exhaust gas flows back down through the outer bed 110 wherein heat is transferred to that bed and stored. The exhaust then flows via plenum 110a to switch 112 and to the exterior. After a predetermined interval, the switch 112 is operated to reverse the air and exhaust flow streams, i.e., air flows up through bed 110, wherein it is pre-heated, then to zone 102, for combustion. The hot exhaust then flows down through bed 109, giving up heat to the latter, then down through plenum 109a and to the exterior via switch 112. The switch is periodically shifted to reverse the air and exhaust flow streams as described.

The top wall 103 defines an opening 103a receiving a quartz receptacle or tube 114, having a bottom wall 114a directly exposed to hot zone 102, and a side wall 114b extending back upwardly in the insulation. A TPV (thermophotovoltaic cell 115) is located in the tube 114 directly above wall (window) 114a to receive heat radiating from the combustion zone. Electrical connections to the cell appear at 116 and 117. In addition, a fluid may be pumped as at 118 to flow via duct 119 to a heat exchanger 120 associated with the cell, for heating the fluid, which then circulates via duct 121 to an external heat exchanger or utilization means 122 (industrial or household). The fluid then flows back to the pump.

The high temperature particles in the beds may advantageously consist of zirconia ($ZrO_2$), calcia stabilized balloons, i.e. hollow particles, about 3 mm in diameter. This material is preferred as it has the highest use temperature in an oxidizing environment of any available material; also zirconia has low thermal conductivity. In this regard, 'calcia stabilized' refers to the use of calcium oxide to stabilize zirconia against breakage. The fact that the form of the material is hollow further reduces thermal conductivity. This material is inexpensive and commercially available in large quantities.

Another material is alumina ($Al_2O_3$), in the form of balloons of the same size as the zirconia pellets. These are cheaper and lighter than zirconia, but their high temperature performance is not as favorable as that of zirconia.

The cells may for example comprise silicon 100 sun concentrator cells, manufactured by Applied Solar Energy Corporation. The cells may have between about 1 and 4 mm diameter active area.

Tests were performed on a typical fixed bed combustor of the general type as shown in FIG. 2. Thermal parameter measurements were made of air flow, fuel flow, and heat loss from the plate. Combustion air flow was measured with a 1.25 inch elliptical flow nozzle, connected to a Dwyer inclined manometer. Measurement range was from 5 cfm to 45 cfm with 5% accuracy. Fuel flow was measured with rotometer type flowmeters, corrected to actual usage pressure. Estimated accuracy is better than 5%. Cooling water flow was measured by both a Badger totalizing flowmeter and a Micromotion Coriolis type electronic mass flowmeter. Cooling water temperature rise was measured directly by a delta T 20 junction type T thermopile. Heating of the water was calculated by multiplying the temperature difference by the water mass flow rate. This calculation has an error of less than 3%. These measurements defined the fundamental thermal quantities.

Other measurements were made to determine various temperatures in the bed and of the exhaust. Temperatures in the bed were measured by type K thermocouples, useful to 1850 C. for short periods. Thermocouple data was read by various means including 12-channel thermocouple indicator, a Kaye 16-channel datalogger and a Fluke temperature reading multimeter. Surface temperature of the bed was measured by viewing the bed through the quartz envelope with a Baytek infrared pyrometer. Radiant flux was measured similarly with an Eppley pyroheliometer.

Electrical parameter measurements were made by instrumenting the test TPV cells. The cells used were silicon 100 sun concentrator cells, manufactured by Applied Solar Energy Corporation. Two sizes were used. Initially a 1 cm active area diameter cell was used. Later tests were made with a higher quality from 4 mm diameter envelope, either open circuit voltage was measured, or the circuit was closed, and current and voltage were measured simultaneously with varying loads. This data was recorded on a flat bed chart recorder. Maximum output power point was determined by comparing voltage current products at different times during a test. Actual current measurement was made by measuring the voltage drop across a 0.00434 Ohm Copel wire resistor (constant resistance vs. temperature). This system rapidly reaches high operating temperatures—2200-2400 K. Thermal efficiency was measured at 79% (see Table 2 and sample calculations, on the pages that follow).

TPV conversion efficiency of this unit was tested by inserting cell probes which employed various cooling strategies. For prototype test purposes, TPV conversion is defined as follows:

$$\eta = \frac{(\text{power output of 1 cell}) \times \left(\frac{\text{area of bed}}{\text{area of 1 cell}}\right)}{(\text{fuel input})}$$

During a two hour test run at temperatures around 2200 K. with a fuel input of 98.7 kW/m² thermal, the maximum cell power output density measure 10.4 kW/m² electric. This is a TPV conversion efficiency of 10.5% (see sample calculations on the pages that follow).

During this testing, the particles bed maintained its integrity, particles did a good job of heat exchange, and materials performed well.

From the above it will be seen that high temperature operational stability is optimized by using beds of small refractory particles serving as both regenerator and radiator. Use of a particle bed or beds allows high temperature operation, while causing no structural problems. Paticles with a spherical shape were found to be optimal. These particles maintain their shape and are free to move in the bed, minimizing thermal and structural stresses in the generator.

TABLE 2
TPV THERMAL EFFICIENCY TESTS DATA

Flat Plate #1
Fuel ($C_3H_8$)

| Date/Time | P PSIG | Q SCFH AIR @ 0 psig | Air Flow nozzle ΔP (in H₂O) | Heat Removal by Water ΔT(mV) | m(lb/min) |
|---|---|---|---|---|---|
| 2-20-86 8:40–9:05 | 85 | 8.5 | .5 | 28 | 4.0 |
| 2-21-86 18:20–18:30 | 95 | 16 | 3.2 | 12.3 | 17.0 |
| 2-24-86 14:45–14:51 | 105 | 21 | 4.0 | 17 | 17.4 |
| 2-27-86 | 120 | 19 | 4.0 | 16.5 | 18.0 |

Flat Plate #2
Fuel ($CH_4$)

| | P PSIG | Q. SCFH $CH_4$ @ 175 PSIG | | | |
|---|---|---|---|---|---|
| 4-16-86* | 49 | 21.5 | 0.1 | 1.9 | 15.6 |

TPV THERMAL EFFICIENCY TEST

| Date | A Temp Reached ± 50 K | Fuel BtU Rate (KBTU/hr) | Heat Removal Rate - From Water (Cooled Plate(kBTU/h) | B Thermal Efficiency = B/A |
|---|---|---|---|---|
| 2-20-86 | 1175 K | 42 | 30 | 71% |
| 2-21-86 | 1375 K | 83 | 56 | 67% |
| 2-24-86 | 1625 K | 114 | 79 | 69% |
| 2-27-86 | 1990 K | 110 | 79.5 | 72% |

TABLE 2-continued

| | | | | |
|---|---|---|---|---|
| 4-16-86* | 2030 K | 11 | 7.94 plate + .76 window | 79% |
| | | | 8.70 | |

Flat Plate #2 — 10″ deep bed — .785 ft² area

Example Calculation
(Flat Plate #2 - Methane Fired)
Energy Input Density and Thermal Efficiency Volume flow:   Gas flow = 2.3 on meter
              Pressure = 42 PSIG $$Q = \frac{42 + 14.7}{175 + 14.7} \quad \text{Rate for 175 PSIG} = .5467 \; (50.0 \; \text{SCFH}) = 27.34 \; \text{SCFH}$$

Energy Flow:
  Assume Fuel = 100% $CH_4$ (Guaranteed to be at lease 97%)
            = 900 (27.34) = 24,600 BTU/hr Reactor Crossection Area (New Area):

$$12″ \text{ Diameter} = \frac{\pi}{4} \; \text{ft}^2 = 0.7854 \; \text{ft}^2$$

Energy Delivery Density:

$$Q/A = \frac{24600}{0.7854} = 31.3 \; \text{KBtu/ft}^2/\text{hr}$$

In kW/m²:

$$Q/A = 31.3 \; \text{kBtu/hr ft}^2 \times 10.76 \frac{\text{ft}^2}{\text{m}^2} \times \frac{1}{3.413 \; \text{KBtu/KW/hr}}$$
$$= 98.7 \; \text{kW/m}^2$$

$$LHV = (21502 \; \text{Btu/lb}_m)(.5584)(.0755 \frac{\text{lb}_m}{\text{ft}^3})$$
$$= 900 \; \text{Btu/ft}^3$$

Example Calculation
Cell Output Power Density

Voltage - Read from chart recorder
  V = (.67) (1 Volt full scale) = .67 volts
Current - Simultaneous Reading
  Voltage = (0.30) × (0.020 volts full scale)
          = 0.0078 volts $$\text{current} = I = \frac{V}{R} = \frac{0.0078}{0.0434} = .180 \; \text{Am}$$

Power - P = IV = (.67) (.180) = 0.121 Watts
Area - 4 mm Dia × .92% active area**
     = (1.256 × 10⁻⁵ m²) (.92) = 1.155 × 10⁻⁵ m²
     = .115 cm²
Power/Area -

$$P_{out} = \frac{.120 \; \text{watts}}{.115 \; \text{cm}^2} = 1.04 \; \text{W/cm}^2$$
$$= 10.4 \; \text{kW/m}^2$$

Example Calculation
4-16-86

$$\text{Conversion Efficiency} = \frac{\text{Power Density Out in Electricity}}{\text{Power Density Input by Fuel}}$$
$$= \frac{10.4 \; \text{KW}_e/\text{m}^2}{98.7 \; \text{KW hr/m}^2} = 10.5\%$$

We claim:

1. A combustor/regenerator process capable of operating at high temperature for sustained periods of time, that includes
  (a) feeding combustion reactants to a combustion zone, the reactants being fed to said zone at initial temperature $T_a$ and having enthalpy content $H_1$,
  (b) adding recuperated heat $Q_r$ to the reactants fed to the combustion zone to raise the reactants temperature to $T_2$, and to raise enthalpy content to $H_2$,
  (c) combusting the reactants in said zone to produce reaction products at increased temperature $T_3$ and with enthalpy content $H_3 \cong H_2$,
  (d) radiating heat from said zone at a rate characterized in that the radiation per unit area per unit time per unit mass of reaction products is $q_p$, the total heat available for radiation being $Q_{34} = H_3 - H_4$ where $H_4$ is the reduced enthalpy of the reaction products, and converting said radiated heat into photovoltaic produced electricity,
  (e) extracting $Q_r$ from said reaction products of combustion for return to the reactants as per (b) above, (f) removing the products of combustion as exhaust and at reduced temperature $T_e$ and enthalpy $H_5$, (g) providing a bed of refractory particles adjacent said combustion zone, and (h) periodically reversing the direction of flow of reactant through said bed.

2. The process of claim 1 wherein said combustion reactants include methane and air.

3. The process of claim 2 wherein the amount of air is in excess of that needed for combustion of the methane.

4. The process of claim 1 wherein $T_3$ is at least about 3700° F., said radiation occurring at said temperature $T_3$.

5. The process of claim 1 wherein said step (e) is carried out by passing the reaction products of combustion in heat exchange relation with the reactants after said step (d), heat radiation from said zone.

6. The process of claim 1 wherein exhaust temperature $T_e$ lies between 632° K. and 308° K.

7. The process of claim 1 wherein said particles are allowed to move during said flow of hot reactant through the bed.

8. The process of claim 1 wherein said bed includes first and second portions, said step (g) including flowing reactant through the first bed portion while hot products of combustion are flowed through the second bed portion, and, subsequently flowing reactant through the second bed portion while flowing hot products of combustion through the first bed portion.

9. The process of claim 8 wherein the bed particles are selected from the group that consists of zirconia and alumina.

10. The process of claim 1 including providing said combustion zone at one end of said bed, said step (a) including flowing hydrocarbon reactant directly into said zone, flowing cool air locally through one portion of the bed and then into said zone to locally cool said bed and to combust with said hydrocarbon reactant in said zone, and including flowing hot reaction products locally through another portion of the bed to locally transfer heat to the bed, said step (h) including periodically reversing the direction of said flows through said one and said other portions of the bed.

11. The process of claim 10 including maintaining insulation about said combustion zone at said one end of the bed.

12. The process of claim 1 wherein said (d) step includes exposing a thermovoltaic cell to heat radiation from said combustion zone.

13. The process of claim 12 including flowing coolant in cooling relation with said cell.

14. A combustor/regenerator apparatus comprising:
(a) an insulated combustion chamber containing a combustion zone,
(b) first and second beds of refractory particles exposed to said zone,
(c) means for supplying a first combustion reactant to said zone,
(d) means for flowing a second combustion reactant to said zone via one of said beds during time $T_1$ and via the other of said beds during time $T_2$,
(e) means for removing combustion products from said zone via the other of said beds during time $T_1$, and via the one bed during time $T_2$,
(f) and thermophotovoltaic cell means exposed to heat radiated from said zone.

15. The apparatus of claim 14 wherein said chamber includes a heat resistant side wall and a heat resistant top wall, the top wall containing an opening, the cell means located in association with said top wall opening.

16. The apparatus of claim 14 wherein said particles are selected from the group that includes zirconia and alumina.

17. The apparatus of claim 14 wherein said other bed surrounds said one bed, and a separator wall is located therebetween, the combustion zone overlying said beds.

18. The apparatus of claim 17 wherein said (d) and (e) means include plenums underlying said beds, and air supply ducting extending to said plenums.

19. The apparatus of claim 15 wherein said (c) means includes jet means associated with said top wall to discharge hydrocarbon reactant into said zone.

20. The apparatus of claim 14 wherein the temperature in said zone is at least about 3,700° F., and the temperature of the combustion products after passing through said bed is between 632° K. and 308° K.

* * * * *